United States Patent

[11] 3,586,019

| [72] | Inventors | David F. Thomas<br>St. Paul;<br>Harold A. Berglund, Afton, both of, Minn. |
|---|---|---|
| [21] | Appl. No. | 784,827 |
| [22] | Filed | Dec. 18, 1968 |
| [45] | Patented | June 22, 1971 |
| [73] | Assignee | Waterous Company<br>Ramsey, Minn. |

[54] FIRE HYDRANT
10 Claims, 11 Drawing Figs.

[52] U.S. Cl. ................................................. 137/68,
137/307, 251/268, 285/3, 287/111
[51] Int. Cl. ............................................. F16l 57/00,
E03b 9/14, F16d 1/00
[50] Field of Search ........................................... 137/68,
272, 283, 284, 294, 296, 298, 302, 307, 797;
285/2, 3, 4, 415, 368, 414; 287/108, 111; 251/267,
268, 269

[56] References Cited
UNITED STATES PATENTS

| 1,821,867 | 9/1931 | Wilson | 285/363 X |
| 2,633,143 | 3/1953 | Simon | 251/269 X |
| 3,453,010 | 7/1969 | Gerretz et al. | 285/414 X |
| 1,556,745 | 10/1925 | Banta | 285/415 X |
| 1,800,010 | 4/1931 | Emerson | 137/797 X |
| 2,019,515 | 11/1935 | Waterous et al. | 137/307 X |
| 2,030,550 | 2/1936 | Smith | 287/111 |
| 2,630,823 | 3/1953 | Mueller et al. | 137/283 |
| 3,439,938 | 4/1969 | Dunton | 137/68 X |
| 3,453,897 | 7/1969 | Adinolfi | 251/267 X |

Primary Examiner—Alan Cohan
Assistant Examiner—Richard Gerard
Attorney—Robert M. Dunning ABSTRACT: The hydrant is made so that if the exposed portion is struck by a moving vehicle or the like this portion will break off with a minimum of damage to the hydrant and vehicle. The operating mechanism provides high strength for wrenching, and protection from corrosion.

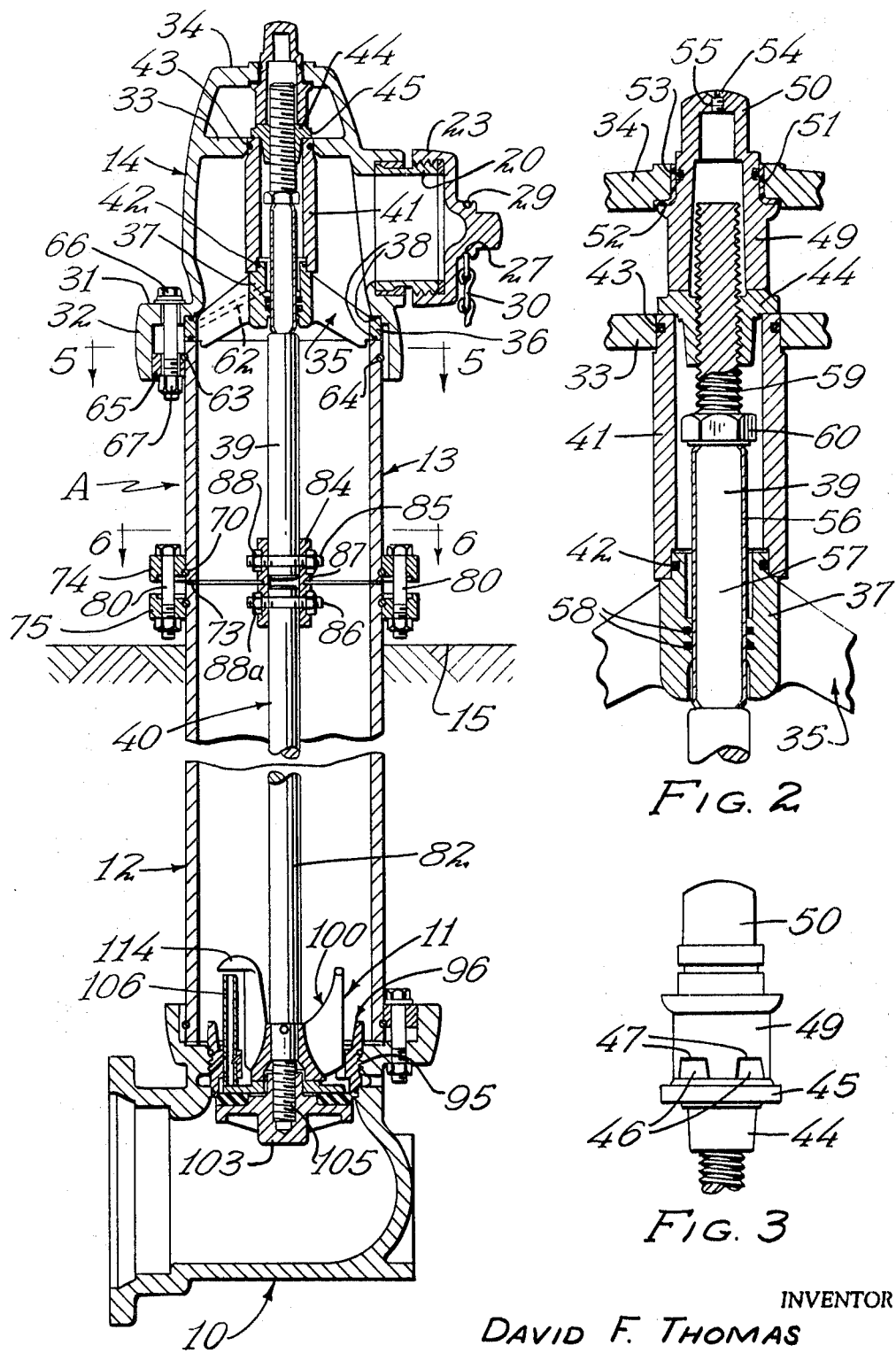

INVENTOR
DAVID F. THOMAS
HAROLD A. BERGLUND
BY Robert M. Dunning
ATTORNEY

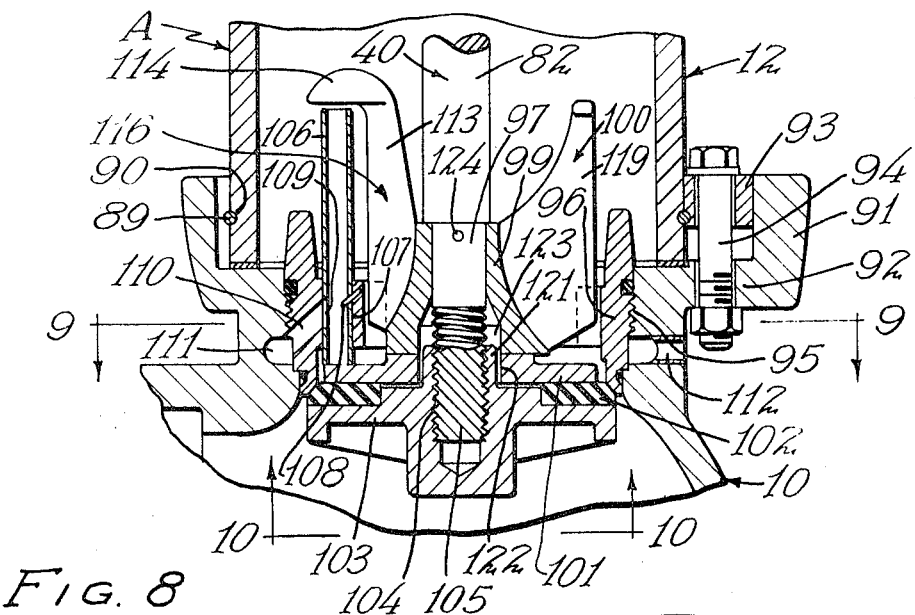

FIRE HYDRANT

This invention relates to an improvement in fire hydrant and deals particularly with a fire hydrant of improved design.

Over a long period of years, while the design of most mechanical devices has been considerably improved, few radical improvements have been made in the design of hydrants. For the most part, the outward appearance of hydrants is much the same as it was many years ago. Most hydrants are still being produced with heavy metal casings of cast iron or the like which are designed to withstand the shock of forces tending to knock them over. As a result, if such hydrants are struck by a moving vehicle or the like with sufficient force, not only is the hydrant damaged beyond repair, but also the vehicle is badly damaged, and the occupants of the vehicle are often seriously damaged by the impact.

Hydrants normally include a vertical standpipe which is secured at its lower end to a fitting to which the water main is connected, and which is provided at its upper end with a head or nozzle section including a plurality of angularly spaced outlets to which fire hoses may be attached. A valve stem extends axially through the standpipe and is anchored at its lower end to a valve. Means is provided extending axially through the nozzle section and which may be rotated relative thereto. The valve rod is threadably connected to the rotatable member so that rotation of the rotatable member will move the valve stem axially to open or close the valve. In the event the exposed portion of the standpipe is struck by a moving vehicle, the standpipe is usually broken, as is also the valve operating rod bent. Difficulty is experienced in repairing the hydrant without digging it up in order to replace the broken parts.

A feature of the present invention resides in the provision of a standpipe made in two end abutting sections clamped together by a pair of clamping flanges which engage noncontinuous rings seated in grooves on opposite sides of the abutting ends of the two sections. The groove in the upper of the two sections is substantially deeper than the groove in the lower section, the groove in the upper section forming a ring-shaped weakened area in the standpipe which may fracture in the event the upper end of the hydrant is struck with sufficient force. As a result, the upper section of the standpipe tends to break off upon sufficient impact, preventing damage to the embedded portion of the standpipe and its connection with the valve structure.

A further feature of the present invention resides in the provision of a valve operating rod formed in upper and lower sections which are connected by a split sleeve secured to the adjoining ends of the valve rod. The sleeve is preferably grooved substantially on the plane of the ends of the two abutting standpipe sections. This groove weakens the sleeve intermediate its ends so that if the upper portion of the hydrant is struck by a moving vehicle, breaking the upper standpipe section at its fracture line, the coupling sleeve will also fracture so that the entire upper portion of the hydrant may be disconnected from the lower embedded portion thereof. When broken in this manner, the impact causes a minimum of damage to the hydrant as well as to the vehicle, and the hydrant can be restored to its normal operating condition, often in a few minutes time.

A further feature of the present invention resides in the provision of a novel means of rotating the valve actuating mechanism. In the event the valve stem operating mechanism is made entirely of cast iron or other ferrous materials, the cooperating threads connecting the operating nut to the valve stem tend to rust. If the operating wrenching nut is made of brass or other noncorrosive material, insufficient strength is provided for the wrenching operation,. Accordingly, in the present device, the operating mechanism is formed of two parts which are clutch connected, the wrenching nut portion being formed of cast iron or similar metal which will withstand the wrenching operation, and the threaded portion being made of brass or similar noncorrosive material. With this arrangement, sufficient strength is provided together with suitable protection against corrosion.

A further feature of this invention lies in the provision of a simple and effective means of preventing the entrance of water into the operating portions of the hydrant. A spider is provided having a central bearing to support the valve rod. This bearing is below the level of the outlets, and is sealed relative to the valve operating rod. Any water leaking past the seals may be drained to atmosphere through a passage leading through one leg of the spider. With this arrangement, the upper threaded end of the valve operating rod cannot be submerged in water, and means is provided for introducing lubricant into the sealed area to inhibit corrosion. The peripheral flange of the spider is clamped between the nozzle section and the upper standpipe section by angularly spaced clamps engaging a ring encircling the upper standpipe section and by clamping bolts supported by the nozzle section and bridging the peripheral flange of the spider to engage the clamps.

A further feature of the invention relates in the provision of a novel means of connecting the standpipe to the nozzle section. A series of angularly spaced clamps are provided in place of the continuous circular flanges normally used to secure the two parts together.

These and other objects and novel features of the present invention will be more clearly and fully set forth in the following specification and claims.

In the drawings forming a part of the specification.

FIG. 1 is a vertical sectional view through the hydrant, showing the general arrangement of parts.

FIG. 2 is an enlarged sectional detail of the upper portion of the valve operating mechanism.

FIG. 3 is a detail view of the connection between the two piece operating nut and the valve operating rod of the device.

FIG. 8 is a vertical sectional view through the valve portion of the hydrant.

FIG. 9 is a sectional view on the line 9–9 of FIG. 8.

FIG. 10 is a bottom plan view of the valve member, the position of the section being indicated by the line 10–10 of FIG. 8 of the drawings.

FIG. 11 is a detail view showing in plan the upper portion of the valve assembly.

Figure 4:
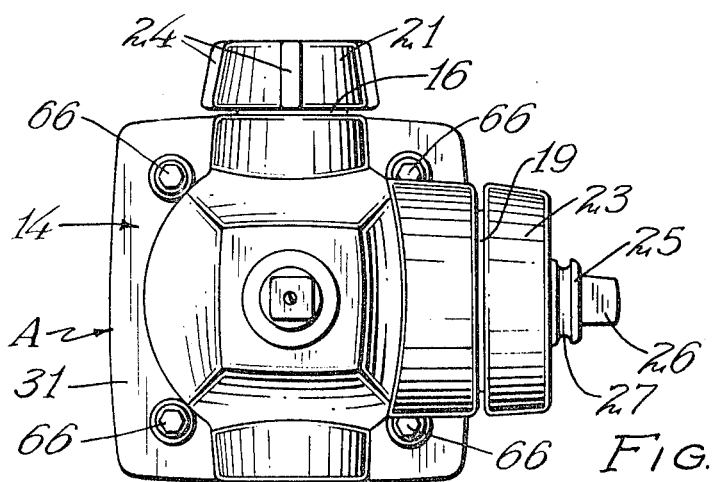
FIG. 4 is a top plan view of the hydrant.

The hydrant is indicated in general by the letter A. The hydrant includes a bottom fitting 10 which may be either in the form of an elbow, as illustrated, or may be in the form of a T. A hydrant valve 11 is seated in the fitting 10 and operates to open or close the water supply. A lower standpipe 12 extends upwardly from the fitting 10 and is secured in end abutting relation with the upper standpipe portion 13. A nozzle section 14 is secured to the upper end of the upper standpipe portion 13.

The lower standpipe portion 12 extends substantially to the ground line 15. Thus the lower standpipe portion 12 is embedded in the ground while the upper standpipe portion 13 and the nozzle section 14 is exposed. The reason for this arrangement is to provide an upper standpipe portion which may be separated from the lower standpipe portion 12 in the event the hydrant is struck by a moving vehicle or the like.

As is perhaps best illustrated in FIG. 4 of the drawings, the nozzle section 14 is provided with a pair of oppositely arranged externally threaded outlets 16 and 17, and an intermediate externally threaded outlet 19. As is indicated in FIG. 1 of the drawings, the outlets are formed by sleeves such as 20 which are anchored to the nozzle section 14 and which extend outwardly therefrom to accommodate closure caps. The closure caps 21 and 22 are designed to close the outlets 16 and 17, while the closure cap 23 is designed to close the outlet 19. The caps 21, 22, and 23 may be similar in form or may be varied somewhat, but in most instances the same type of cap is used for all three outlets. However, for the purpose of illustration, the caps 21 and 22 are provided with radially extending ribs 24 which may be engaged by a spanner wrench or similar tool. The cap 23 is shown as including an extension 25 which extends axially from the cap and terminates in a square or other multisided projection 26 which may be engaged by a wrench. The projection 25 is peripherally grooved as indicated at 27 to accommodate a ring 29 shown in FIG. 1 of the drawings, and which is connected by a chain 30 to a fixed portion of the hydrant. Obviously, the purpose of this chain 30 is to prevent the cap from being lost or carried away after it has been removed to expose the interior of the hydrant.

As is indicated in FIGS. 1 and 4 of the drawings, the lower portion of the nozzle section 14 includes a generally square outwardly extending flange 31 having a downwardly extending peripheral skirt 32 thereupon. The manner in which the nozzle section is attached to the upper standpipe section 13 will be later described in detail.

The nozzle section 14 is provided with a transverse partition wall 33 parallel to the closed upper end 34 thereof. A spider 35 having a circular peripheral rib 36 is interposed between the upper end of the upper standpipe portion 13 and the nozzle section 14. The spider rim 36 is sealed relative to the upper standpipe section 13 and the nozzle section 14 by sealing rings 38. The spider 35 is provided with a central axial sleeve or hub 37 which forms a bearing for the upper portion 39 of a valve operating rod 40 which is designed to operate the valve 11. A sleeve 41 is interposed between the hub of the spider 35 and the partition 33, and is sealed relative thereto by sealing rings 42 and 43. A lower operating nut 44 made of brass or other noncorrosive material is provided with a peripheral flange 45 which rests upon the upper end of the sleeve 41. As is indicated in FIG. 3 of the drawings, the nut 44 is provided with a plurality of angularly spaced teeth 46 extending upwardly therefrom. The teeth 46 are designed to engage in cooperable notches 47 in upper operating nut 49 which extends through the top portion 34 of the nozzle section 14, and which terminates in a hollow multisided wrenching boss 50 which may be rotated by a suitable wrench.

As indicated in FIG. 2 of the drawings, a flanged bushing 51 of noncorrosive plastic or metal is provided in the end 34, and a peripheral flange 52 on the nut 49 engages the lower face of the flanged bushing 51. A sealing ring 53 seals the nut 49 with respect to the bushing 51, which is cemented to, and therefore sealed to the upper end 34 of the nozzle section. As is indicated in FIG. 2, a screw 54 is threaded into an axial opening extending through the upper end of the boss 50, the screw extending into a threaded passage 55. The purpose of this arrangement is to provide a means of lubricating the upper end of the valve rod 39. By removing the screw 54, oil may be inserted into the upper end of the upper operating nut 49, to lubricate the upper end of the valve rod as well as the lower operating nut 44.

As is also indicated in FIG. 2 of the drawings, a bushing 56 of brass or similar noncorrosive material encircles the intermediate portion 57 of the valve rod 39 below the threaded upper end portion 59 thereof. A nut 60 is threaded onto the threaded portion 59 of the rod 39 and against the upper end of bushing 56 to form a stop to limit vertical movement of the valve rod 39. Sealing rings 58 are provided in the hub 37 of the spider 35 to seal the valve rod relative to the spider. As is indicated in FIG. 1 of the drawing, a drain passage 62 extends through one of the arms of the spider 35 and permits any liquid which leaks into the sleeve 41 to escape to atmosphere.

It will be noted that the hub 37 extends below the level of the outlets 16, 17, and 19, and the seals 58 are below the outlet openings. As the interior of the sleeve 41 encircling the upper end 39 of the valve operating rod 40 is connected to atmosphere through the drain passage 52, the valve operating portions of the hydrant are isolated from the water flowing through the hydrant when the valve 11 is open.

As is perhaps best illustrated in FIG. 1 of the drawings, a noncontinuous ring 63 is seated in a peripheral groove 64 near the upper end of the upper standpipe section 13. The nozzle section 14 is held in place by clamping lugs 65 which engage against ring 63 and which are retained from radial movement by skirt 32 of nozzle section 14. The clamping lugs 65 are moved vertically by means of clamping bolts 66 having nuts 67 at their lower ends which engage against the lugs 65. By tightening the bolts 66, the nozzle section 14 is clamped to the upper standpipe section 13 with the ring shaped periphery 36 of the spider 35 clamped therebetween. The same four clamps which hold the nozzle section in place also hold the spider in position.

Figure 7:
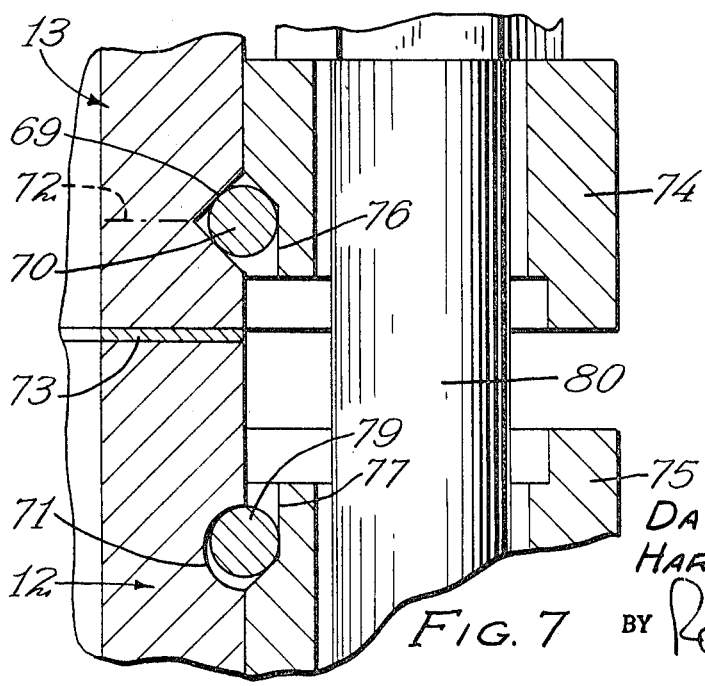
FIG. 7 is an enlarged detail view through a portion of the apparatus.

The lower standpipe section 12 is clamped to the upper standpipe section 13 by means of the structure shown in FIG. 1 and shown in more detail in FIG. 7 of the drawings. The upper standpipe section 13 is provided with a peripheral V-shaped groove 69 near its lower end which accommodates a noncontinuous metal ring 70 normally seated therein. The upper end of the lower standpipe section 12 is provided with a generally semicylindrical groove 71 which is substantially shallower than the groove 69. The purpose of this arrangement is to provide a weakened area in the upper standpipe section 13 which is indicated by the broken line 72. As a result, in the event the hydrant is struck by a moving vehicle, the upper standpipe section 13 will tend to break off along the broken line 72.

As will be evident from FIGS. 1 and 7, a gasket 73 is provided between the two end abutting standpipe sections 12 and 13. An upper clamping flange 74 encircles the upper standpipe section 13, and includes an counterbore 76 which accommodates the ring 70. The lower clamping flange 75 is similarly counterbored as indicated at 77 to accommodate the ring 79 which is seated in the groove 71 near the upper end of the lower standpipe section 12. The rings 70 and 79 are usually noncontinuous metal rings which resiliently engage in the grooves. Bolts 80 extend through the flanges 74 and 75 and act to clamp the two flanges and accordingly the two standpipe sections in end abutting relation.

The valve operating rod 40 has been described as including a lower portion which is indicated generally by the numeral 82, and an upper portion which is indicated by the numeral 39. A split sleeve 84 consisting of two identical parts generally semicircular in cross section forms a connection between the upper and lower sections of the valve operating rod. The two halves of the sleeve 84 are attached to the upper rod portion 39 by nuts 88 and a stud 85 and to the upper end of the lower rod section 82 by nuts 88a and by a stud 86. The sleeve 84 is provided with a peripheral groove 87 which is aligned with the space between the opposed ends of the two valve rod sections. In the event the hydrant is struck by a moving vehicle or similar force, and the upper section of the standpipe is broken, and therefore tends to lift away from the lower portion 12 thereof, the sleeve 84 will break at the groove 87, and the upper portion of the valve operating rod will become readily disconnected from the lower portion thereof.

Figure 6:
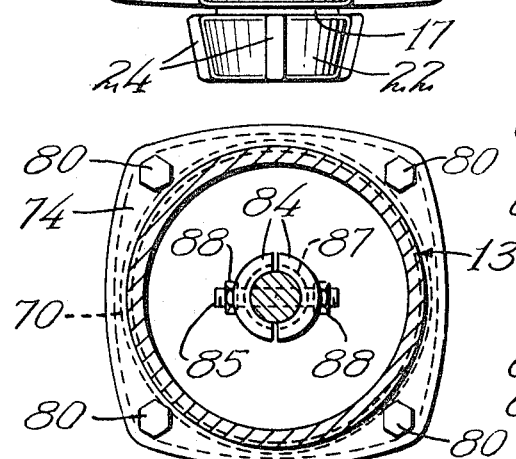
FIG. 6 is a horizontal sectional view through the apparatus, the position of the section being indicated by the line 6–6 of FIG. 1.
Figure 5:
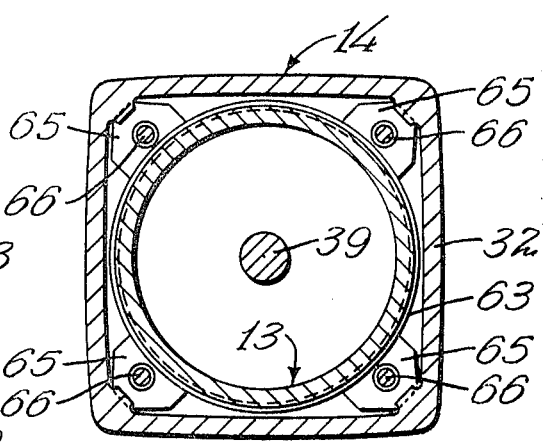
FIG. 5 is a horizontal sectional view, the position of the section being indicated by the line 5–5 of FIG. 1.

As is indicated in FIG. 6 of the drawings, and as described above the sleeve 84 is actually formed of two semicylindrical sleeve portions to simplify the operation of repairing the hydrant in the event it becomes damaged.

The hydrant valve is best illustrated in FIG. 8 of the drawings. The lower standpipe section 12 is clamped to the fitting 10 in much the same manner as the nozzle section 14 is attached to the upper standpipe section 13. A noncontinuous ring 89 is seated in a peripheral groove 90 in the lower end of the standpipe section 12. The fitting 10 is provided with an upwardly extending peripheral skirt 91 which extends upwardly from a laterally extending flange 92 of generally square outline. Clamping lugs 93 are positioned within the corners of the upwardly extending skirt 91, and are designed to engage the ring 89. Clamping bolts 94 are provided for drawing the clamps 93 against the ring 89 in order to hold the parts assembled.

The upper end of the fitting 10 is internally threaded as indicated at 95, and a cylindrical valve seat 96 is threaded into the opening. The lower end 82 of the valve rod 40 is provided with a reduced diameter portion 97 which accommodates the hub 99 of an upper valve member 100. A valve washer 101 is positioned beneath the hub 99, and a valve ring 102 of rubber or other resilient material is clamped between the washer 101 and the lower valve washer 103. The valve washer 103 is provided with an axial socket 104 which accommodates the threaded lower end 105 of the lower valve rod 82.

In order to permit the gradual drain of water from the standpipe 12 after the hydrant has been in operation, a slotted tube 106 is slidably supported in an inwardly extending lug 118 of the valve seat 96 extending vertically through an opening 107 therein. The tube 106 is held from rotation by a pin 108 extending through the valve seat and into the slot of the tube. The slotted tube frictionally engages the opening 107 and tends to remain in fixed position. The tube 106 is provided with an outlet opening 109 which communicates with a passage 110 leading to a peripheral groove 111 in the upper portion of the fitting 10. This groove 111 is shown as indicated at the right-hand side of FIG. 8 to lead to a passage 112 leading to the exterior of the member 10. The member 100 includes an upwardly extending arm 113 which supports a laterally extending arm 114 overlying the upper end of the tube 106. The lower end of the tube 106 rests upon the washer 101.

When the valve is in open position, the water flows about the periphery of the valve and upwardly through the standpipe to the outlet or outlets. However, when the valve is closed, the water within the standpipe may flow through the tube 106 and the outlet 110 and gradually drain from the hydrant to the surrounding ground.

The valve element 11 is supported as a unit. The hub 99 is formed, as shown in FIG. 9, with a flattened side 115. Arm 113 includes a web 116 which slides between inwardly extending projections 118a on lug 118 of valve seat 96. The upper valve member 110 member 100 includes an upwardly extending web 119 which slides between inwardly extending projections 120 on the valve seat 96. In this manner the valve assembly is held from rotation relative to the valve seat. The lower valve washer 103 is provided with a generally diamond shaped upward projection 121 which extends through a similarly shaped aperture 122 in the upper valve washer 101 and into a similarly shaped socket 123 in the hub 99, preventing relative rotation once the parts are assembled. The hub 99 is pinned to the valve rod section 82 as indicated at 124, holding the assembly from rotating relative to the rod 82 and thereby becoming disconnected.

The operation of the valve is believed obvious from the foregoing description. As the valve is reciprocated downwardly, the tube 106 is lowered by engagement of the arm 114 with the top of the tube. This slides the tube outlet 109 out of registry with the fixed outlet 110 so that water under pressure will not escape therethrough. As the valve closes, the tube 106 is again moved to the position shown in FIG. 8, allowing the interior of the standpipe to drain.

I have described the principles of construction and operation of my improvement in fire hydrants, and while I have endeavored to set forth the best embodiment thereof, I desire to have it understood that changes may be made within the scope of the following claims without departing from the spirit of my invention.

I claim:

1. A hydrant including:
a valve housing,
a valve within said housing,
a standpipe secured to said housing,
a nozzle section including at least one water outlet,
a valve operating rod connected to said valve for actuating the same,
means extending axially through said nozzle section engaging said rod for actuating the same,
a flange encircling said nozzle section at the lower end thereof,
a downwardly extending skirt on the periphery of said flange,
a ring encircling said standpipe near the upper extremity thereof,
a plurality of angularly spaced clamps having one side thereof engaging said skirt and the opposite side thereof engaging said ring,
a bolt extending through said flange and through each said clamps,
nuts on said bolts beneath said clamps, the skirt and ring engaging surfaces of the clamps being so formed that tightening of said bolts will cause a radial force as well as axial force by said clamps against said ring, and
said clamps, when loosened, permitting angular adjustment of said nozzle section relative to said standpipe about the axis thereof.

2. The structure of claim 1 and in which said valve operating rod is threaded and in which said means extending through said nozzle section includes:
a lower operating nut engaged upon said threaded rod,
wrenching means for holding said nut from upward axial movement relative to said nozzle section, and
said wrenching means extending axially through said nozzle section and being coupled to said lower operating nut for rotation therewith.

3. The structure of claim 1 and in which said valve operating rod includes aligned upper and lower portions, a sleeve connecting said rod portions and secured thereto, a peripheral groove in said sleeve forming a readily fracturable area, a pair of parallel studs extending through said rod portions near the adjoining ends thereof, said sleeve being formed in two generally semicylindrical sleeve sections and including apertures through which said studs extend, and including nuts on said studs clamping said sleeve sections together.

4. A hydrant including:
a valve housing,
a valve in said housing,
a valve operating rod secured to said valve for actuating the same,
a standpipe connected to said valve housing and enclosing said valve operating rod,
a spider supported by said standpipe at the upper end thereof through which said valve operating rod extends,
a sleeve encircling said valve operating rod and supported by said spider,
a lower operating nut threadably connected to said valve rod and supported by said sleeve,
a nozzle section secured overlying said spider and supported thereby and including at least one water outlet,
wrench engaging means extending axially from said nozzle section and coupled to said lower operating nut to rotate therewith, said wrench engaging means being restrained from upward movement by said nozzle section and holding said lower operating nut from upward movement.

5. In a hydrant having a valve housing, a valve in said housing, a valve operating rod secured to said valve for actuating the same, and a standpipe connected to said valve housing and enclosing said valve operating rod, a valve rod operating means including:
a spider supported by said standpipe at the upper end thereof having a coaxial aperture through which said valve operating rod extends,
a nozzle section supported by and above said spider,
means securing said nozzle section to said standpipe,
a sleeve supported by said spider encircling said valve operating rod,
an operating nut supported by said sleeve and held from downward movement thereby,
a wrench engaging member extending through said nozzle section for access externally thereof, said wrench engaging member encircling the upper end of said valve operating rod and coupled to said operating nut for rotation in unison therewith, means on said wrench engaging member engaging said nozzle section to prevent upward movement of said wrench engaging member and said operating nut.

6. The structure of claim 5 and in which said wrench engaging member includes a flange engaging said nozzle section forming said means to hold the same from upward movement.

7. The structure of claim 5 and including a partition wall in said nozzle section on a plane normal to the axis of said valve rod encircling the upper end of said sleeve.

8. The structure of claim 7 and in which said partition wall is sealed relative to said sleeve.

9. In a hydrant having a standpipe and a nozzle section supported above, and in alignment with, said standpipe, a connecting means including:

a peripheral flange at the lower end of said nozzle section, a downwardly extending skirt on the periphery of said flange, a peripheral groove adjacent the upper end of said standpipe inwardly of said skirt, a ring engaged in said groove, said ring being of substantially circular cross section, a plurality of angularly spaced clamps each having one side engaging said skirt and having the opposite side engaging said ring, a bolt extending through each clamp and through said flange, a nut on each bolt engaging the under side of a corresponding said clamp, the skirt and ring engaging surfaces of the clamps being so formed that tightening of said bolts will cause a radial force as well as an axial force against said ring.

10. The structure of claim 9 and in which said peripheral flange is generally rectangular in plan and in which said bolts extend through corner portions of said flange.